United States Patent Office 3,446,862
Patented May 27, 1969

3,446,862
CYCLODIMERIZATION PROCESS
Henry R. Menapace, Stow, and Neil A. Maly, Tallmadge, Ohio, assignors to The Goodyear Tire & Rubber Company, Akron, Ohio, a corporation of Ohio
No Drawing. Filed Oct. 2, 1967, Ser. No. 672,006
Int. Cl. C07c 3/00
U.S. Cl. 260—666    4 Claims

ABSTRACT OF THE DISCLOSURE

An improved process for the cyclodimerization of 1,3-diolefins is disclosed. The catalyst system employed is a mixture of (1) an iron salt or complex, (2) a ligand and (3) a reducing agent which is an organometallic compound or metal hydride, the metal portion of which is selected from Groups I, II and III of the Periodic System, and the reaction is conducted in an aromatic solvent system. The improvement comprises conducting the cyclodimerization reaction at temperatures of at least 85° C. and not greater than 130° C.

---

This invention relates to the cyclodimerization of 1,3-diolefins. More specifically it relates to an improved method for producing high yields of cyclodimers of 1,3-butadienes at rapid reaction rates and high selectivity.

It has recently become known that 1,3-butadiene hydrocarbons can be converted catalytically into dimers which are predominantly cyclodimers. For instance, 1,3-butadiene can be converted to a dimer form in which 1,5-cyclooctadiene is the major product, with some vinyl cyclohexene being produced. The cyclodimers of 1,3-butadienes can be employed as precursors to form dibasic acids, diamines, diisocyanates and other difunctional chemical compounds by known techniques.

These prior art processes which have been reported use a catalyst system comprising a mixture of (1) an iron salt or complex such as ferric acetylacetonate, (2) a reducing agent such as triethyl aluminum and (3) a ligand such as phenyl acetylene or triphenyl phosphine or 2,2'-bipyridyl. The reaction is conducted in benzene as a solvent and at temperatures ranging only up to 50° C.

However, it has been observed that these prior art processes, while they produce a fairly good conversion of the 1,3-butadiene hydrocarbon converted to a dimer, the selectivity to the desirable cyclodimer is not too impressive. For instance, when 1,3-butadiene is dimerized by these prior art processes, the conversion is only fair, about 70%, but selectivity to 1,5-cyclooctadiene is unusually low with maximum yields only up to about 33%.

It has been unexpectedly discovered that certain changes in operating conditions of these prior processes have resulted in a considerable improvement in both the conversion of the 1,3-butadiene hydrocarbons to the dimer form and a rather startling improvement in the selectivity to the cyclic form of the dimer as well as a considerable improvement in the reaction rate.

Accordingly, the invention of this application is as follows: In a process of cyclodimerizing 1,3-butadiene hydro carbons which comprises contacting at least one 1,3-butadiene hydrocarbon, in an inert solvent system, with a ternary catalyst comprising (1) at least one material selected from the group consisting of iron salts and iron complexes, (2) a ligand and (3) at least one reducing agent selected from the group consisting of organometallic compounds and metallic hydrides, the metal portions of which are selected from Groups I, II and III of the Periodic System of Elements, the improvement comprising conducting the said cyclodimerization reaction at temperatures of at least 85° C. and not greater than 130° C.

By the term "1,3-butadiene hydrocarbons" or "1,3-diolefin" is meant a diolefin of which 1,3-butadiene is the simplest, isoprene, 2-ethyl butadiene, piperylene and the like.

The preferred iron salts useful as one of the catalyst components of this invention are selected from the iron salts of carboxylic acids containing from 2 to 40 carbon atoms. Representative but by no means exhaustive of the iron salts of carboxylic acids include ferric acetate, ferric propionate, ferric n-butyrate, ferric isobutyrate, ferric n-pentanoate, ferric 3-methyl-butyrate, ferric trimethyl acetate, ferric octanoate, ferric 2-ethyl hexanoate and the like. Other iron organic complex compounds useful as the iron portion of the catalyst includes the ferric complexes of 1,3-diketones. The 1,3-diketone types form semi-chelate complexes with iron and show good results. Representative, but not all inclusive, of some of the 1,3-diketone iron complexes are ferric 2,4-pentanedione (commonly called ferric acetylacetonate); ferric 3-methyl-2,4-pentanedione, ferric 1-ethoxy-1,3-butanedione; ferric 1,3-diethoxy-1,3-propanedione; ferric 1,3 - diphenyl - 1,3 - propanedione; ferric 1 - cyclohexyl - 1,3 - butanedione and the like. Also useful in this invention as the iron salt component of the catalyst system are the ferricsalts of alkyl substituted naphthenic carboxylic acids and the ferric soaps or iron drier compounds. Ferric salts of individual naphthenic acids are rarely found. The naphthenic acids are usually complex mixtures with their common derivatives being cyclopentane, cyclohexane, cycloheptane and the higher molecular weight alkyl-substituted analogs. The ferric soaps comprise iron in combination with fatty acids such as stearic rosin (resinates) and tall oil (tallates). Ferric stearate is the most common compound of this last group. Of all of these, ferric octanoates and ferric acetylacetonates are the preferred compounds for the iron salt component of the catalyst system.

The second component of the catalyst system are reducing agents consisting of at least one member of the class of metal compounds selected from the group consisting of organometallic compounds, halides and hydrides of elements of Groups Ia, IIa, IIb and IIIa of the Periodic System of Elements. The preferred metallic elements from the above groups are lithium, sodium, potassium, magnesium, calcium, boron and aluminum. Representative, but not all inclusive, of suitable compounds of the above metallic elements are lithium hydride, calcium hydride, aluminum hydride, phenyl sodium, phenyl lithium, n-butyl lithium, tertiary butyl lithium, benzyl potassium, phenyl magnesium chloride, ethyl magnesium bromide, diethyl magnesium, triethyl aluminum, triisobutyl aluminum, diethyl aluminum bromide, diethyl aluminum chloride, dibutyl zinc, diethyl zinc and the like. Triethyl aluminum and n-butyl lithium are preferred organometallic compounds for use with this invention.

The third component of the complex catalyst system consists of an organic ligand-type molecule. The ligand is believed to direct the reaction toward the cyclodimer formation and result in the high selectivity of 1,5-cyclooctadiene from 1,3-butadiene at high conversion rates. The class of ligands found most useful to bring about the improved selectivity of desired cyclodimers at high reaction rates which is characteristic of this invention are members of the bipyridyl class of compounds. Bipyridyls are compounds obtained by the condensation of two molecules of pyridine or substituted pyridine molecules. Bipyridyls are analogous to the diphenyl compounds. Representative but by no means all inclusive of the bipyridyl compounds useful in the present invention include bipyridyl and 4,4'-dimethyl-2,2'-bipyridyl. Other bipyridyl type compounds which are suitable as ligands include 1,10-phenanthroline, 4,4'-ditertiary butyl-2,2'-bipyridyl and the like. Pyridine itself is useful as the catalytic ligand component but gives poorer performance than the bipyridyl types. The substituted 4,4'- dimethyl-2,2'-bipyridyl and other substituted forms of bipyridyl are the most preferred ligand compounds for use in this invention.

The components of the catalyst system employed in this invention should be as pure as can be economically obtained. The catalyst components should be essentially free of moisture and other deleterious substances. Particularly deleterious to the catalyst system of this invention are strong Lewis acid and Lewis base type compounds.

When the catalyst system employed to cyclodimerize the 1,3-butadiene or other 1,3-diolefin is mixed with the iron salt, and the ligand and then the reducing agent, the order of addition of the catalyst components and reagents is critical. It is important that all the catalyst components except the reducing agent be blended together in the presence of the 1,3-diolefin before the reducing agent is added. If otherwise, the reaction rate tends to be greatly decreased.

The ligand to iron mole ratio of the above catalyst system can vary over considerable range. Although there is no definite lower range of ligand to use, sufficient ligand must be employed to assure a high selectivity of the desired cyclodimer. There is no upper limit to the ligand/$Fe^{+++}$ mole ratio but large excesses of ligand would represent an economic waste. It has been found experimentally that ligand/Fe mole ratios between 1.5/1 to 2.5/1 result in satisfactory cyclodimerization reactions with a ratio of about 2.0/1 being most preferred.

The mole ratio of reducing agent to $Fe^{+++}$ can be quite critical. Although no upper limit of reducing agent is specified, a large excess of reducing agent in the order of 20 times the $Fe^{+++}$ level often results in rapid polymerization of the 1,3-diolefin to a polymeric form rather than in selective cyclodimerization. Although no lower limit of reducing agent/$Fe^{+++}$ mole ratio is specified, sufficient reducing agent must be used to promote a practical cyclodimerization of the 1,3-diolefin. When the reducing agent is an alkyl lithium compound, the optimum mole ratio of reducing agent/$Fe^{+++}$ for good cyclodimerization has been found to vary between 8.0/1 and 10.0/1. When the reducing agent is an alkyl aluminum compound, the optimum reducing agent/$Fe^{+++}$ mole ratio varies between 4.0/1 and 9.0/1.

The total amount of catalyst used is based on the ratio of 1,3-diolefin to $Fe^{+++}$. Sufficient catalyst concentration must be present to cause the cyclodimerization reaction to proceed. Excess of catalyst with respect to the 1,3-diolefin to be cyclodimerized will result in an economic waste. It has been found that 1,3-diolefin/$Fe^{+++}$ mole ratios between 400/1 and 1000/1 produce satisfactory cyclodimerization reactions, with a mole ratio of between 500/1 and 650/1 being more preferred.

In the cyclodimerization processes of the prior art, the reaction conditions have been widely varied, particularly the temperatures and the pressure. However, it has been discovered that unless a temperature of at least 85° C. is employed, the selectivity to the completely cyclic dimer is not high enough to make the process one which is practical. For instance, in a process to produce 1,5-cyclooctadiene from butadiene, unless the temperature is at least 85° C., the selectivity to 1,5-cyclooctadiene is too low to be practical. It has also been found that if temperatures above about 130° C. are employed, there is a reduction in the selectivity to 1,5-cyclooctadiene. Therefore, it is deemed that the temperature range of from 85° C. to 130° C. is critical.

The pressures employed can range from ambient pressure created by the monomer solvent system at the particular operating temperatures to upper limits maintained by inert gas. Although there is no absolute upper limit, it appears that a range of from the ambient pressure of the contained monomer solvent system to pressures of 350 to 400 p.s.i.g. produced by the inert gas is the most practical range to employ.

It is usually desirable to conduct the cyclodimerization in the presence of an inert hydrocarbon diluent or solvent. These inert diluents should not adversely affect the cyclodimerization reaction. Representative of these inert diluents are the aromatic hydrocarbons such as benzene, toluene, xylene and the like. The aliphatic hydrocarbons such as hexane, heptane, pentane, isooctane and the like may also be used as the inert diluent. Mixtures of these hydrocarbons may also be used. Of the inert hydrocarbon diluents, it is usually preferred to use an aromatic solvent such as toluene or xylene.

When a diluent is used, the diluent to diene monomer ratios may vary over some range without affecting the conversion or selectivity of the cyclodimer formed. The concentration of the diene monomer in the inert solvent may vary between 1 and 3 molar with a 2 molar concentration appearing to be the most optimum.

In conducting the cyclodimerization to which this invention is directed, it is usually desirable to employ air-free and moisture-free techniques. The catalyst systems employed are sensitive to the effects of oxygen and moisture. Procedures for air-free and moisture-free techniques are known in the art and will not be discussed herein detail.

The practice of this invention is further described and illustrated by reference to the following examples which are intended to be illustrative rather than restrictive.

EXAMPLES

In these examples which were conducted in a 300 milliliter stainless steel, stirred autoclave, the reactants were mixed in the following order: The 1.3-diolefin was dissolved in the solvent; the iron salt or complex and the ligand added and this mixture brought up to the operating temperature at which time the reducing agent was added. The reaction time was counted from the addition of the reducing agent until the reaction was stopped by destroying the catalyst with isopropanol. The results were determined by vapor phase chromatography using conventional techniques.

In the following examples the reactants are listed; the reaction conditions are set forth; the mole ratio of the reactants is reported and the results obtained are reported in terms of percent conversion of the diolefin to dimer and the percent selectivity to each of the particular dimers formed.

EXAMPLE I

Reactants: Butadiene, ferric acetyl acetonate, 2,2'-bipyridyl and triethylaluminum
Conditions:
  Temperature—94 to 103° C.
  Pressure—290 to 275 p.s.i.g.
  Time—29 minutes
  Solvent—Benzene
Ratios: Fe/2,2'-bipyridyl/Al/butadiene mole ratio= 0.0002/0.0004/0.0020/0.1
Results:
  95% conversion
  83% selectivity to 1,5-cyclooctadiene
  17% selectivity to 4-vinylcyclohexene

EXAMPLE II

Reactants: Butadiene, ferric acetyl acetonate, 2,2'-bipyridyl and triisobutylaluminum
Conditions:
  Temperature—98 to 106° C.
  Pressure—385 to 355 p.s.i.g.
  Time—25 minutes
  Solvent—Benzene
Ratios: Fe/2,2'-bipyridyl/Al/butadiene=0.002ü0.0004/ 0.0012/0.1
Results:
  97% conversion
  83% selectivity to 1,5-cyclooctadiene
  17% selectivity to 4-vinylcyclohexene

EXAMPLE III

Reactants: Butadiene, ferric acetyl acetonate 2,2'-bipyridyl and n-butyllithium
Conditions:
  Temperature—89 to 111° C.
  Pressure—385 to 370 p.s.i.g.
  Time—17 minutes
  Solvent—Benzene
Ratios: Fe/2,2'-bipyridyl/Li/butadiene=0.0002/0.0004/0.0016/0.1

Results:
  97% conversion
  80% selectivity to 1.5-cyclooctadiene
  17% selectivity to 4-vinylcyclohexene

EXAMPLE IV

Reactants: Butadiene, ferric octanoate, 2,2'-bipyridyl and triethylaluminum
Conditions:
  Temperature—90 to 100° C.
  Pressure—415 to 395 p.s.i.g.
  Time—25 minutes
  Solvent—Benzene Ratios: Fe/2,2'-bipyridyl/Al/butadiene=0.0002/0.0004/0.0010/0.1

Results:
  98% conversion
  82% selectivity to 1,5-cyclooctadiene
  16% selectivity to 4-vinylcyclohexene

EXAMPLE V

Reactants: Butadiene, ferric octanoate 2,2'-bipyridyl and n-butyllithium
Conditions:
  Temperature—92 to 107° C.
  Pressure—410 to 400 p.s.i.g.
  Time—25 minutes
  Solvent—Benzene
Ratios: Fe/2,2'-bipyridyl/Li/butadiene=0.0002/0.0004/0.0020/0.100

Results:
  89% conversion
  83% selectivity to 1,5-cyclooctadiene
  18% selectivity to 4-vinylcyclohexene

EXAMPLE VI

Reactants: Piperylene, ferric octanoate, 4,4'-dimethyl-2,2'-bipyridyl and triethylaluminum
Conditions:
  Temperature—99 to 102° C.
  Pressure—379 to 381 p.s.i.g.
  Time—55 minutes
  Solvent—Toluene Ratios: Fe/4,4'-dimethyl-2,2'-bipyridyl/Al/piperylene=0.0002/0.0004/0.0010/0.1
Results:
  32% conversion
  About 50% selectivity to dimethylcyclooctadiene
  About 50% selectivity to cyclohexenes

EXAMPLE VII

Reactants: Isoprene, ferric octanoate, 4,4'-dimethyl-2,2'-bipyridyl and triethylaluminum
Conditions:
  Temperature—97 to 103° C.
  Pressure—389 to 387 p.s.i.g.
  Time—55 minutes
  Solvent—Toluene Ratios: Fe/4,4'-dimethyl-2,2'-bipyridyl/Al/isoprene=0.0002/0.0004/0.0010/0.1
Results:
  84% conversion
  90% selectivity to dimethylcyclooctadienes
  10% selectivity to cyclohexenes Examples VI and VII indicate that position of substitution on the diene molecule has a significant effect on the cyclodimerization reaction.

EXAMPLE VIII

Comparison of the relative effects of benzene and toluene on conversions and selectivities when these aromatics are used as diluents in a butadiene monomer system.

Reactants: Butadiene, ferric acetylacetonate 2,2'-bipyridyl and triethylaluminum
Conditions:
  Temperature—102 to 103° C.
  Pressure—Benzene, 415 to 405 p.s.i.g.; toluene, 387 to 361 p.s.i.g.
  Time—2 minutes
  Solvent—As shown Ratios: Fe/2,2'-bipyridyl/Al/butadiene=0.0002/0.0004/0.0010/0.1

Results:

| Solvent | Percent conversion | Percent selectivity for 1,5-cyclooctadiene | Percent selectivity for 4-vinylcyclohexene |
|---|---|---|---|
| Benzene | 83 | 77 | 16 |
| Toluene | 96 | 82 | 16 |

Example VIII indicates that toluene as a solvent promotes both a faster cyclodimerization rate as well as a higher selectivity of the more desirable cyclodimer.

EXAMPLE IX

Reactants: Isoprene, ferric octanoate, 4,4'-dimethyl-2,2'-bipyridyl and triethylaluminum
Conditions:
  Temperature—101 to 109° C.
  Pressure—375 to 379 p.s.i.g.
  Time—55 minutes
  Solvent—Toluene Ratios: Fe/4,4'-dimethyl-2,2'-bipyridyl/Al/isoprene=0.0002/0.0004/0.0010/0.1

Results:
  74% conversion
  87% selectivity to dimethylcyclooctadienes
  8% selectivity to cyclohexenes While certain representative embodiments and details have been shown for the purpose of illustrating the invention, it will be apparent to those skilled in this art that various changes and modifications may be made therein without departing from the spirit or scope of the invention.

What is claimed is:
1. In a process for cyclodimerizing 1,3-butadiene hydrocarbons which comprises contacting at least one 1,3-butadiene hydrocarbon in an inert solvent with a ternary catalyst comprising (1) at least one material selected from the group consisting of iron salts and iron complexes, (2) a ligand and (3) at least one reducing agent selected from the group consisting of organometallic compounds and metallic hydrides, the metal portions of which are selected from Groups I, II and III of the Periodic System of Elements, the improvement comprising conducting the said cyclodimerization reaction at temperatures of at least 85° C. and not greater than 130° C.

2. The process according to claim 1 wherein the monomer is butadiene, the iron salt catalyst component is ferric acetylacetonate, the ligand catalyst component is 4,4'-dimethyl-2,2'-bipyridyl and the reducing agent is triethyl aluminum.

3. The process according to claim 1 where the organic diluent is toluene.

4. The process according to claim 1 wherein the iron salt is ferric octanoate, the ligand is 2,2'-bipyridyl and the reducing agent is n-butyllithium.

References Cited

UNITED STATES PATENTS

| 3,219,716 | 11/1965 | Wittenberg | 260—666 |
| 3,277,099 | 10/1966 | Seibt | 260—666 |
| 3,227,767 | 1/1966 | Feldman | 260—666 |
| 3,377,397 | 4/1968 | Maxfield | 260—666 |

OTHER REFERENCES

Hidai et al.: Bull. Chem. Soc. Japan, vol. 39, (7), pp. 1357–64 (1966).

Misono: Bull. Chem. Soc. Japan, vol. 39, (11), pp. 2425–9 (1966).

DELBERT E. GANTZ, *Primary Examiner.*

V. O'KEEFE, *Assistant Examiner.*